United States Patent
Nicholls et al.

(10) Patent No.: US 9,158,538 B2
(45) Date of Patent: Oct. 13, 2015

(54) USER-EXTENSIBLE RULE-BASED SOURCE CODE MODIFICATION

(75) Inventors: Peter A. Nicholls, Janetville (CA); Andrea K. Rice, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 11/751,508

(22) Filed: May 21, 2007

(65) Prior Publication Data
US 2008/0295069 A1    Nov. 27, 2008

(51) Int. Cl.
*G06F 9/45* (2006.01)
*G06F 9/44* (2006.01)

(52) U.S. Cl.
CPC ... *G06F 8/76* (2013.01); *G06F 8/51* (2013.01)

(58) Field of Classification Search
CPC .............. G06F 8/76; G06F 8/51; G06F 8/427
USPC .................................................. 717/136, 143
See application file for complete search history.

(56) References Cited

U.S. PATENT DOCUMENTS

| | | | | |
|---|---|---|---|---|
| 4,989,145 | A | * | 1/1991 | Kyushima ........................ 704/9 |
| 5,809,282 | A | | 9/1998 | Cooper et al. |
| 6,275,223 | B1 | * | 8/2001 | Hughes ......................... 715/751 |
| 6,453,464 | B1 | * | 9/2002 | Sullivan ........................ 717/137 |
| 2002/0100022 | A1 | | 7/2002 | Holzmann |
| 2002/0184615 | A1 | | 12/2002 | Sumner et al. |
| 2003/0051055 | A1 | | 3/2003 | Parella et al. |
| 2003/0055593 | A1 | | 3/2003 | Scholtzhauer et al. |
| 2004/0068715 | A1 | * | 4/2004 | Wong et al. .................... 717/136 |
| 2004/0111712 | A1 | * | 6/2004 | Humpert et al. ............... 717/136 |
| 2004/0181753 | A1 | * | 9/2004 | Michaelides ................. 715/523 |
| 2005/0028143 | A1 | | 2/2005 | Aridor et al. |
| 2005/0049843 | A1 | * | 3/2005 | Hewitt et al. .................... 703/14 |
| 2006/0015856 | A1 | | 1/2006 | Lotter |
| 2006/0116999 | A1 | | 6/2006 | Dettinger et al. |
| 2006/0277231 | A1 | * | 12/2006 | Kral et al. ...................... 708/102 |
| 2007/0011669 | A1 | * | 1/2007 | Varma et al. ................... 717/168 |
| 2007/0044066 | A1 | * | 2/2007 | Meijer et al. ................... 717/100 |

OTHER PUBLICATIONS

Barros, S., et al; Supporting Impact Analysis: a Semi-Automated Technique and Associated Tool; 1995 IEEE.
Baxter, Ira D.; Parallel Support for Source Code Analysis and Modification; SCAM '02; IEEE.

* cited by examiner

*Primary Examiner* — Anna Deng
(74) *Attorney, Agent, or Firm* — Steven M. Greenberg, Esq.; CRGO Law

(57) ABSTRACT

Embodiments of the present invention address deficiencies of the art in respect to parsing for source code porting and provide a novel and non-obvious method, system and computer program product for a user-extensible rule-based source code modification tool. According to an aspect of the present invention, an automated parsing tool for parsing and modifying source code is provided which supports the addition of user-defined rules, and which parses and either modifies source code or suggests modifications to source code based upon the user-defined rules. Users can also associate a user-defined or predefined modification with each rule so that upon detection of a condition satisfying the rule, the user can be presented with the modification as an option. Compound rules built by using one or more rules as preconditions to a rule are also supported.

18 Claims, 2 Drawing Sheets

USER-EXTENSIBLE RULE-BASED SOURCE CODE MODIFICATION

BACKGROUND OF THE INVENTION

1. Field of the Invention

The present invention relates to the field of lexical analysis of source code and static code review and more particularly to source code parsing.

2. Description of the Related Art

Lexical analysis refers to conversion of a sequence of characters in a body of text into tokens. Once a sequence of characters has been converted into tokens, the tokens can be characterized according to function in order to provide meaning and context to the body of text. The initial stage of the lexical analysis generally involves the application of a finite state machine to an ordered sequence of text in order to emit finite character strings according to the configuration of the finite state machine, often referred to as a scanner. Subsequently, the tokenization stage performed by a tokenizer demarcates and classifies the finite sections of strings into tokens. Finally, an evaluator attaches meaning to tokens through the application of rules to the tokens.

Lexical analysis, known to the skilled artisan as parsing, forms an integral part of software development as a fundamental stage of code building. In this regard, in the context of code building, parsing is the process of analyzing a sequence of tokens in source code to determine its grammatical structure with respect to a given formal grammar of a programming language. Parsing transforms input text in source code into a data structure, usually a tree, which is suitable for later processing during the compilation phase of code building and which captures the implied hierarchy of the input.

Parsing finds particular application to static code review. Static code review refers to the parsing of source code to identify program code constructs for the purpose of optimizing the source code and detecting programmatic and syntactical errors within the source code. In static code review, source code can be parsed and compared to existing rules in order to flag portions of the source code of concern. Advanced forms of static code reviewing tools provide for code modification based upon pre-defined rules included as part of static code reviewing tools.

Source code often must be ported from one platform to another. Historically, the process of porting source code involved the manual review and modification of source code to account for the particular nuances of a target platform. Given the complexity of modern software design, manually porting source code can be tedious at best and more often than not is a virtual impossibility. To address the difficulty in porting source code, static code review tools have been configured to apply a set of predefined rules in order to parse source code and to make required changes according to the rules. Other sophisticated tools merely suggest manual changes where an automatic change is not appropriate.

The development task of porting source code from one platform to the next can vary in difficulty and complexity. Different developers approach the problem differently, in consequence. Yet, static code reviewing tools can be inflexible in that the rules incorporated into static code reviewing tools are hard-coded rules defined without regard to the specific task of porting source code from one particular platform to another. To modify the hard-coded rules of a static reviewing tool requires language-specific coding skills and access to the code base of the static reviewing tool itself.

BRIEF SUMMARY OF THE INVENTION

Embodiments of the present invention address deficiencies of the art in respect to parsing for source code porting and provide a novel and non-obvious method, system and computer program product for a user-extensible rule-based source code modification tool. According to an aspect of the present invention, an automated parsing tool for parsing and modifying source code is provided which supports the addition of user-defined rules, and which parses and either modifies source code or suggests modifications to source code based upon the user-defined rules, or does both of these. Users can also associate a user-defined or predefined modification with each rule so that upon detection of a condition satisfying the rule, the user can be presented with the modification as an option. Compound rules built by using one or more rules as preconditions to a rule are also supported.

In one embodiment of the invention, a user-extensible rule-based source code modification tool can be provided. The tool can include a rule definition interface providing access for end users to establish rules for porting source code to a target platform. The tool further can include a scanner configured to parse source code into multiple different token sets. Finally, the tool can include a rule analyzer configured to match the different token sets with the rules in order to modify the source code for porting to the target platform in accordance with selected matched ones of the rules. In one aspect of the embodiment, the rule definition interface can include an interface to select for a new rule at least one predecessor rule to be matched in order to match the new rule.

In another aspect of the embodiment, the rule definition interface further can include an interface to specify a location in the source code for matching the predecessor rule. In yet another aspect of the embodiment, the rule definition interface can include an interface to multiple different templates, each corresponding to a different set of tokens derived from source code. The rule definition interface also can include an interface to a mapping of selected ones of the templates to different source code modification actions such as inserting source code text into the source code, replacing existing source code text in the source code with different source code text, deleting source code text from the source code, and commenting out the source code.

In another embodiment of the invention, a method for user-extensible rule-based source code modification can be provided. The method can include loading end-user established source code modification rules and parsing source code into different sets of tokens. The method further can include matching the rules to the different sets of tokens and modifying the source code according to selected matched ones of the rules. Finally, the method can include proposing modifications for the source code according to other matched ones of the rules. In one aspect of the embodiment, matching the rules to the different sets of tokens can include preliminarily matching the rules to the different sets of tokens, resolving dependencies among the preliminarily matched rules, and providing a final set of matched rules excluding rules lacking matching dependencies.

In another aspect of the embodiment, matching the rules to the different sets of tokens can include preliminarily matching the rules to the different sets of tokens, identifying more specifically matching ones of the preliminarily matched rules, and providing a final set of matched rules excluding less specifically matching ones of the preliminarily matched rules. In yet another aspect of the embodiment, modifying the source code according to selected matched ones of the rules can include evaluating a regular expression to produce source code modifying text for inclusion in the source code, and inserting the produced source code modifying text into source code corresponding to a matched one of the rules.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for user-extensible rule-based source code modification. In accordance with an embodiment of the present invention, source code modification rules can be established by an end user for modifying source code when porting the source code to a target platform. The user established source code modification rules can be applied to a static code review of the source code in order to apply modifications to the source code consistent with the user established rules. In this regard, the modifications can be applied directly in an automated fashion, or the modifications can be suggested through a user interface for the benefit of the user in applying the modifications manually to the source code. In this way, the rules determining the methodology for porting source code to a target platform can change independently of the source code modification tool itself and can be extended at will by end users without affecting the underlying code of the source code modification tool.

Figure 1:
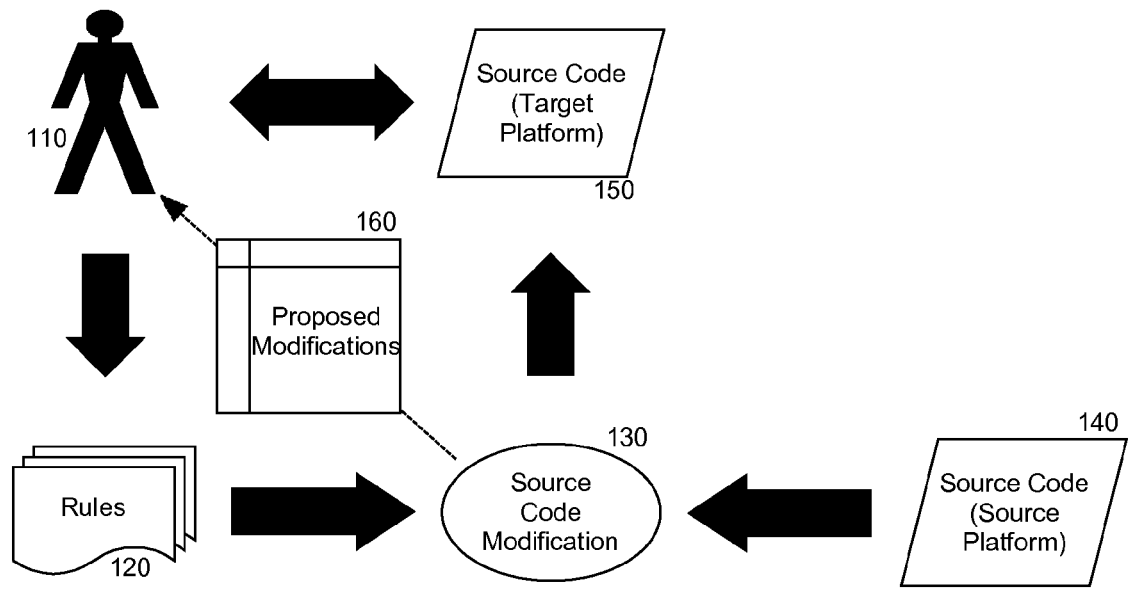
FIG. 1 is a pictorial illustration of a user-extensible rule-based source code modification tool.

In illustration, FIG. 1 pictorially depicts a user-extensible rule-based source code modification tool. As shown in FIG. 1, an end user 110 can establish rules 120 for modifying source code for a target platform when porting source code to the target platform. The rules 120 can include, for example, regular expression matching statements and corresponding actions. The corresponding actions can include the addition of, replacement of, or removal of text (code or commentary) for the source code. The rules 120 can be pluggably coupled to a source code modification tool 130 and applied therein on source code 140 to produce either or both of a display of proposed modifications 160 to the source code 140 and modified source code 150. In the former instance, the end user 110 can take the proposed modifications 160 under advisement when manually applying changes to the modified source code 150.

Figure 2:
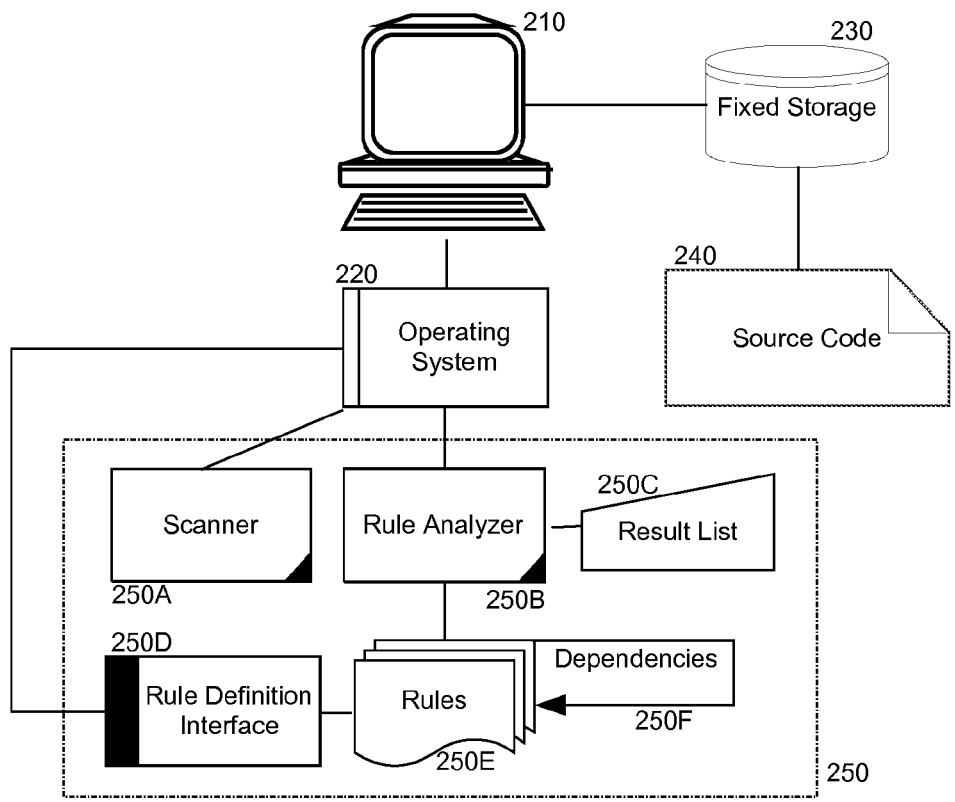
FIG. 2 is a schematic illustration of a source code modification data processing system configured for user-extensible rule-based source code modification; and, FIG. 3 is a flow chart illustrating a process for user-extensible rule-based source code modification.

In further illustration, FIG. 2 is a schematic illustration of a source code modification data processing system configured for user-extensible rule-based source code modification.

The system can include a host computing platform 210 coupled to fixed storage 230 and supporting an operating system 220. The operating system 220 can be configured to execute a source code modification tool 250 in modifying source code 240 in fixed storage 230 for porting from one platform to another. The source code modification tool 250, however, can be configured to apply user-extensible rules 250E in performing source code modification of the source code 240.

Specifically, the source code modification tool 250 can include a scanner 250A and a rule analyzer 250B. The scanner 250A can be configured to parse source code 240 into tokens according to a grammar specific to a source platform for the source code 240 and the programming language of the source code 240. In this regard, multiple different versions of the scanner 250A can be provided to accommodate different grammars. In any event, rule analyzer 250B can include program code enabled to process rules 250E on the tokens of the source code 240 produced by scanner 250A in order to locate matches for different ones of the rules 250E. Notably, individual ones of the rules 250E can be dependent upon the matching of others of the rules 250E in the form of dependencies 250F.

The processing of the rules 250E by the rule analyzer 250B can result in a result list 250C of matching sets of tokens produced by the scanner 250A and corresponding suggested actions including the deletion, insertion or modification of text into the source code 240 or the annotation of a known error in porting the source code 240. The result list 250C can be processed to automatically apply the suggested actions to the source code 240, or to manually apply the suggested actions to the source code 240 by an end user, or to automatically apply some suggested actions to the source code 240 while awaiting user confirmation or user instructions before applying other suggested actions to the source code 240. Importantly, a rule definition interface 250D can be provided to facilitate the establishment of the rules 250E by end users.

In particular, the rule definition interface 250D can provide different templates to match different language constructs for different languages supported for the source code 240. Through the rule definition interface 250D, not only can end users select a template to match a language construct in the source code 240, but also end users through the rule definition interface 250D can select one or more other established rules 250E as pre-conditions for a match so that one or more of the established rules 250E can depend upon the successful matching of one or more other of the established rules 250E.

The rule definition interface 250D yet further can provide an interface to specify a relative location in the source code 240 to apply pre-conditioned ones of the rules 250E. For example, the interface can specify "line before", "same line", "same file" as a location to match a pre-conditioned one of the rules 250E. In this way a successful match of any of the rules 250E for source code text dependent upon the matching of other source code text elsewhere in the source code 240 can be accommodated. Notably, once established, the rules 250E can be shared amongst different users so as to achieve code reuse type efficiencies. Consequently, selected ones of the different users can be classified as administrative users permitted to create and modify rules 250E.

Figure 3:
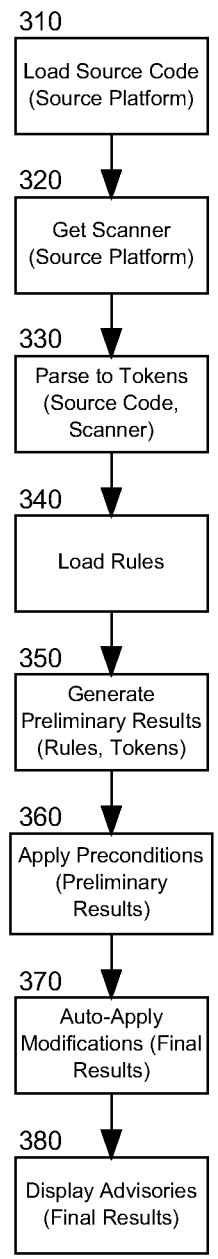

In yet further illustration, FIG. 3 is a flow chart illustrating a process for user-extensible rule-based source code modification. Beginning in block 310, source code can be loaded for a source platform including source language. In block 320, a scanner can be selected corresponding to the source platform including source language. In block 330, the scanner can be applied to the source code to produce a set of parsed tokens.

In block 340, a set of user defined rules can be loaded for processing and in block 350, preliminary results for source modification can be generated by matching the rules to the set of tokens.

In block 360, pre-conditions for relevant ones of the rules can be resolved in the preliminary results to produce a set of final results. More specifically, rules in the preliminary results having preconditions in the form of other rules can be resolved and any rules lacking successfully matching preconditioned rules can be removed from consideration. Also, different rules can be labeled as more specific forms of other rules such that in a set of related rules in the preliminary results, only the most specific of the rules can be placed in the final results and the remaining, less specific related rules can be excluded from the final results. Thereafter, selected ones of the final results can be automatically applied to the source code to produce modified source code in block 370. By comparison, in block 380 remaining ones of the final results can be provided in a view for the end user to consider when manually applying modifications to the source code.

In particular, different rules can specify the removal of associated source code text from within the source code. Other rules can specify the replacement of associated source code text with new source code text, or the insertion of new source code text in the source code. The new source code text can be statically specified in the text, or the rule can include a regular expression to be dynamically evaluated when matching the rule to dynamically determine the new source code text. Yet other rules can specify the commenting out of existing source code text. Finally, to facilitate in a manual review of the modified source code, a compare view can be provided of the original source code and the modified source code.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A user-extensible rule-based tool for modifying source code of a software application suitable to run on a source platform to be ported to a target platform, comprising:
    a rule definition interface configured to provide access for end users to establish rules for porting the source code to the target platform so that the software application can run on the target platform and to specify the relative location as one of a line before, a same line, and a same file, wherein the rule definition interface provides different templates to match different language constructs for different languages supported for the source code and the rules identify the relative location of each of the different lines of source code to be modified based upon a position of each of the different lines relative to other lines of source code;
    a processor configured to
        load a source code file of source code into a memory of a computer,
        parse the source code of the source code file into multiple different token sets,
        match the different token sets with the rules based upon the relative location of the rules, and
        generate suggested modifications to the source code according to selected matched ones of the rules; and
    a user interface for the end users to select modifications from the suggested modifications and apply the selected modifications to the source code.

2. The tool of claim 1, wherein
the rule definition interface is configured to permit end users to select, for a new rule, at least one predecessor rule to be matched in order to match the new rule.

3. The tool of claim 1, wherein
the rule definition interface comprises:
    an interface to the different templates, each template corresponding to a different set of tokens derived from source code; and
    an interface to a mapping of selected ones of the templates to different source code modification actions selected from the group consisting of
    inserting source code text into the source code,
    replacing existing source code text in the source code with different source code text,
    deleting source code text from the source code, and
    commenting out the source code.

4. The tool of claim 1, wherein
the rule definition interface is configured to permit end users to formulate and assign a regular expression to a rule, the regular expression dynamically evaluating an assigned rule.

5. The tool of claim 1, wherein
the rule definition interface is configured to permit end users to label different rules as more or less specific versions of one another.

6. The tool of claim 1, wherein
the processor is further configured to parse, match, and modify based upon and additional, different grammar for a different programming language.

7. A method for user-extensible rule-based source code modification, the method comprising:

loading, in a rule definition interface, multiple different end-user established source code modification rules for modifying source code to run on a source platform to be ported to a target platform so that the software application can run on the target platform, wherein the rule definition interface provides different templates to match different language constructs for different languages supported for the source code, the rules identifying a relative location of each of the different lines of source code to be modified based upon a position of each of the different lines relative to other lines of source code;

loading a source code file of source code into a memory of a computer;

parsing, by a processor, source code of the source code file into different sets of tokens;

matching, by the processor, the rules to the different sets of tokens based upon the relative location of the rules;

generating, by the processor, suggested modifications to the source code according to selected matched ones of the rules; and, providing a user interface for end users to specify the relative location as one of a line before, a same line, and a same file and to select modifications from the suggested modifications and apply the selected modifications to the source code.

8. The method of claim 7, wherein
the matching comprises:
preliminarily matching the rules to the different sets of tokens;
resolving dependencies among the preliminarily matched rules; and
providing a final set of matched rules excluding rules lacking matching dependencies.

9. The method of claim 7, wherein
the matching comprises:
preliminarily matching the rules to the different sets of tokens;
identifying more specifically matching ones of the preliminarily matched rules; and
providing a final set of matched rules excluding less specifically matching ones of the preliminarily matched rules.

10. The method of claim 7, wherein to apply the selected modifications to the source code comprises:
evaluating a regular expression to produce source code modifying text for inclusion in the source code; and
inserting the produced source code modifying text into source code corresponding to a matched one of the rules.

11. The method of claim 7, wherein to apply the selected modifications to the source code comprises commenting out source code text corresponding to a matched one of the rules.

12. The method of claim 7, further comprising
providing a compare view of the source code and a modified form of the source code.

13. A computer program product comprising at least one non-transitory computer usable storage medium having stored therein computer usable program code for user-extensible rule-based source code modification, the computer usable program code, which when executed by a computer hardware device, causes the computer hardware device to perform loading, in a rule definition interface, multiple different end-user established source code modification rules for modifying source code to run on a source platform to be ported to a target platform so that the software application can run on the target platform, wherein the rule definition interface provides different templates to match different language constructs for different languages supported for the source code, the rules identifying a relative location of each of the different lines of source code to be modified based upon a position of each of the different lines relative to other lines of source code;

loading a source code file of source code into a memory of a computer;

parsing source code of the source code file into different sets of tokens;

matching the rules to the different sets of tokens based upon the relative location of the rules;

generating suggested modifications to the source code according to selected matched ones of the rules; and providing a user interface for end users to specify the relative location as one of a line before, a same line, and a same file and to select modifications from the suggested modifications and applying the selected modifications to the source code.

14. The computer program product of claim 13, wherein
the matching comprises:
preliminarily matching the rules to the different sets of tokens;
resolving dependencies among the preliminarily matched rules; and
providing a final set of matched rules excluding rules lacking matching dependencies.

15. The computer program product of claim 13, wherein
the matching comprises:
preliminarily matching the rules to the different sets of tokens;
identifying more specifically matching ones of the preliminarily matched rules; and
providing a final set of matched rules excluding less specifically matching ones of the preliminarily matched rules.

16. The computer program product of claim 13, wherein applying the selected modifications to the source code comprises:
evaluating a regular expression to produce source code modifying text for inclusion in the source code; and
inserting the produced source code modifying text into source code corresponding to a matched one of the rules.

17. The computer program product of claim 13, wherein applying the selected modifications to the source code comprises commenting out source code text corresponding to a matched one of the rules.

18. The computer program product of claim 13, wherein the computer usable program code further causes the computer hardware system to perform
providing a compare view of the source code and a modified form of the source code.

* * * * *